(12) United States Patent
Balk et al.

(10) Patent No.: US 9,068,087 B2
(45) Date of Patent: Jun. 30, 2015

(54) AQUEOUS BINDER COMPOSITION

(75) Inventors: Roelof Balk, Boehl-Iggelheim (DE); Rolf Dersch, Neustadt (DE); Uwe Dittrich, Dannstadt-Schauernheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1198 days.

(21) Appl. No.: 12/067,272

(22) PCT Filed: Oct. 5, 2006

(86) PCT No.: PCT/EP2006/067063
§ 371 (c)(1),
(2), (4) Date: Mar. 18, 2008

(87) PCT Pub. No.: WO2007/042449
PCT Pub. Date: Apr. 19, 2007

(65) Prior Publication Data
US 2008/0275165 A1      Nov. 6, 2008

(30) Foreign Application Priority Data
Oct. 13, 2005   (DE) .................. 10 2005 049 402

(51) Int. Cl.
| C08L 33/14 | (2006.01) |
|---|---|
| C09D 5/02 | (2006.01) |
| C09D 167/08 | (2006.01) |
| C08L 25/18 | (2006.01) |
| C08L 33/04 | (2006.01) |
| C08L 25/00 | (2006.01) |
| C08L 33/00 | (2006.01) |
| C08L 67/08 | (2006.01) |

(52) U.S. Cl.
CPC . *C09D 5/02* (2013.01); *C08L 25/18* (2013.01); *C08L 33/14* (2013.01); *C08L 33/04* (2013.01); *C08L 25/00* (2013.01); *C08L 33/00* (2013.01); *C08L 67/08* (2013.01); *C09D 167/08* (2013.01)

(58) Field of Classification Search
CPC ......... C08L 25/00; C08L 25/18; C08L 33/00; C08L 33/14; C08L 33/04; C08L 67/08; C08L 31/02; C09D 167/08
USPC ............ 260/22, 23, 29.2, 29.6; 428/431, 463, 428/401; 524/404, 500, 501, 502, 533, 543, 524/556, 558, 559, 804, 823, 832, 833, 524/849; 525/296, 303; 526/317.1, 318.4, 526/318.43, 72, 75, 320, 321
See application file for complete search history.

(56) References Cited

U.S. PATENT DOCUMENTS

| 4,288,351 A * | 9/1981 | Miller et al. ................... 524/512 |
|---|---|---|
| 4,447,567 A * | 5/1984 | Geerdes et al. ................ 523/501 |
| 4,451,596 A * | 5/1984 | Wilk et al. ..................... 523/501 |
| 4,624,973 A | 11/1986 | Kuwajima et al. |
| 6,348,528 B1 | 2/2002 | Schlarb et al. |
| 6,599,351 B1 | 7/2003 | Rentschler et al. |
| 6,610,776 B2 * | 8/2003 | Laubender et al. ........... 524/558 |
| 2004/0063835 A1 | 4/2004 | Paar et al. |
| 2006/0100316 A1 * | 5/2006 | Cogordan ..................... 523/501 |

FOREIGN PATENT DOCUMENTS

| DE | 3427 647 A1 | 2/1985 |
|---|---|---|
| DE | 198 26 379 A1 | 12/1999 |
| EP | 0 551 942 A2 | 7/1993 |
| EP | 0 874 875 B1 | 6/2001 |
| EP | 1 382 663 A2 | 1/2004 |
| WO | WO 97/26303 | 7/1997 |
| WO | WO 99/46337 | 9/1999 |
| WO | WO 2004069933 A1 * | 8/2004 .............. C08L 67/08 |

OTHER PUBLICATIONS

WorleeSol E 150 W Technical Leaflet (Feb. 19, 2009). Available Online at: http://ch.worlee.de/produktdatenbank/MB/06120e.pdf.*
Synthalat W 46. Synthopol Chemie (Mar. 2003) Available Online at: http://www.synthopol.com/products/details.php?lang=en&auswahl=farben_lacke&table=Alkydharze_wasserverduennbare&id=5#.*
U.S. Appl. No. 12/663,713, filed Dec. 9, 2009, Balk, et al.

* cited by examiner

*Primary Examiner* — Ling Choi
*Assistant Examiner* — David L Miller
(74) *Attorney, Agent, or Firm* — Oblon, McClelland, Maier & Neustadt, L.L.P.

(57) ABSTRACT

The present invention relates to an aqueous binder composition comprising (a) at least one emulsion polymer comprising as monomer units a $C_1$-$C_8$ alkyl (meth)acrylate, a vinylaromatic compound having up to 20 carbon atoms or mixtures thereof, (b) at least one water-soluble alkyd resin having a weight-average molecular weight of between 5000 and 40 000 Da, and (c) at least one alkyd resin having a weight-average molecular weight of more than 100 000 Da in the form of an aqueous emulsion, wherein the solids content of the mixture of (a), (b), and (c) is less than 60% by weight, and also to their use and preparation.

18 Claims, No Drawings

AQUEOUS BINDER COMPOSITION

CROSS REFERENCE TO RELATED APPLICATION

This application is a 371 of PCT/EP06/067063, filed on Oct. 5, 2006, and claims priority to German Patent Application No. 10 2005 049 402.1, filed on Oct. 13, 2005.

The present invention relates to an aqueous binder composition which can be used as a component in coating materials, particularly for highly glossy coating materials (high-gloss paints).

Binders for coating materials can usually be divided into two groups: solventborne systems, and systems with water as solvent or dispersion medium.

The former group includes the predominant portion of the alkyd binders; the latter group includes the acrylate dispersions.

The former group is coming under fire at the present time for reasons of environmental policy, and a changeover to water-based systems with a low VOC (volatile organic compounds) content would therefore be desirable.

EP 1 382 663 discloses water-emulsifiable or water-thinnable products. The water-thinnable oils or alkyd resins are reacted with anhydrides which contain cycloolefinic unsaturation.

EP 874 875 discloses a water-based hybrid binder composition and its use as a component in a paint or varnish mixture, the hybrid binder composition possessing a dry matter content of 60% to 95% by weight.

DE 3 427 647 discloses an aqueous coating material comprising an aqueous resin and water-insoluble resin particles, the solids weight ratio of the aqueous resin to the water-insoluble resin particles being 99/1-40/60. The coating materials disclosed are used as baking varnishes.

These prior-art compositions have the disadvantage, however, that they are not in tune with the desired requirements in terms of gloss and surface smoothness.

The object of the invention was therefore to develop an aqueous binder composition for coating materials, particularly for high-gloss paints, and also the preparation and formulation thereof, which are distinguished by very high gloss and low haze in conjunction with a high hiding power.

This object has been achieved in accordance with the invention by means of an aqueous binder composition comprising
a) at least one emulsion (co)polymer comprising as monomer units a $C_1$-$C_8$ alkyl (meth)acrylate, a vinylaromatic compound having up to 20 carbon atoms or mixtures thereof,
b) at least one water-soluble alkyd resin having a weight-average molecular weight of between 5000 and 40 000 Da, and
(c) at least one alkyd resin having a weight-average molecular weight of more than 100 000 Da in the form of an aqueous emulsion, wherein the solids content of the mixture of (a), (b), and (c) is less than 60% by weight.

Furthermore, preferred emulsion (co)polymers comprise compounds of the general formula I

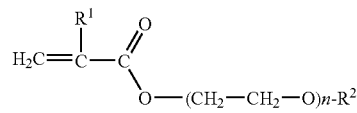

or II; or mixtures thereof;

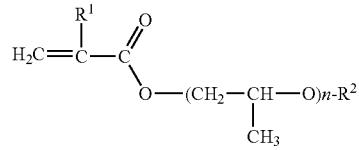

in which $R^1$ is a hydrogen atom or a methyl group, $R^2$ is a hydrogen atom or an aliphatic or aromatic hydrocarbon group having 1 to 20 carbon atoms, and n is an integer from 3 to 15 and more preferably from 4 to 12.

The emulsion copolymer (a) is preferably composed in all of
a) 40% to 99.5% by weight of principal monomers selected from
  $C_1$ to $C_8$ alkyl (meth)acrylates, vinylaromatic compounds having up to 20 carbon atoms,
b) 0.5% to 30% by weight of monomers of the formula I or II,
c) 0 to 50% by weight of further monomers.

With particular preference the emulsion copolymer is composed of
a) 50% to 98% by weight of principal monomers,
b) 2% to 20% by weight of monomers of the formula I or II, and
c) 0 to 40% by weight of further monomers.

With very particular preference the emulsion copolymer is composed of
a) 60% to 97% by weight of principal monomers,
b) 3% to 15% by weight of monomers of the formula I or II, and
c) 0 to 30% by weight of further monomers.

Examples of principal monomers include $C_1$-$C_8$ alkyl (meth)acrylates such as methyl methacrylate, methylacrylate, n-butyl, isobutyl or tert-butyl acrylate, ethyl acrylate, and 2-ethylhexyl acrylate.

In particular, mixtures of the alkyl (meth)acrylates as well are suitable.

Suitable vinylaromatic compounds include vinyltoluene, α- and p-methylstyrene, α-butylstyrene, 4-n-butylstyrene, 4-n-decylstyrene, and, preferably, styrene.

Preferred principal monomers are the alkyl (meth)acrylates, particularly the $C_1$-$C_8$ alkyl (meth)acrylates, vinylaromatic compounds having up to 20 carbon atoms, especially styrene, and mixtures of the above monomers.

Further monomers are, for example, hydroxyl-comprising monomers, especially $C_1$-$C_{10}$ hydroxyalkyl (meth)acrylates, (meth)acrylamide, ethylenically unsaturated acids, especially carboxylic acids, such as (meth)acrylic acid or itaconic acid, and their anhydrides, dicarboxylic acids and their anhydrides or monoesters, examples being maleic acid, fumaric acid, and maleic anhydride.

The emulsion copolymer has a glass transition temperature Tg of preferably less than 50° C., more preferably less than 40° C., very preferably less than 30° C.

By the glass transition temperature $T_g$ here is meant the midpoint temperature as determined by differential thermoanalysis (DSC) in accordance with ASTM D 3418-82 (cf. Ullmann's Encyclopedia of Industrial Chemistry, 5th Edition, Volume A 21, VCH Weinheim 1992, p. 169 and also Zosel, Farbe und Lack 82 (1976), pp. 125-134; see also DIN 53765).

According to Fox (see Ullmanns Enzyklopädie der technischen Chemie, 4th Edition, Volume 19, Weinheim (1980), pp. 17, 18) the glass transition temperature $T_g$ can be estimated. For the glass transition temperature of copolymers with little or no crosslinking it holds in good approximation at high molar masses that:

$$\frac{1}{Tg} = \frac{X^1}{Tg^1} + \frac{X^2}{Tg^2} + \cdots \frac{X^n}{Tg^n}$$

where $X^1, X^2, \ldots, X^n$ are the mass fractions $1, 2, \ldots, n$ and $T_g^1, T_g^2, \ldots, T_g^n$ are the glass transition temperatures of the polymers constructed in each case only from one of the monomers $1, 2, \ldots, n$, in degrees Kelvin. The latter are known, for example, from Ullmann's Encyclopedia of Industrial Chemistry, VCH, 5th Edition, Weinheim, Vol. A 21 (1992) p. 169 or from J. Brandrup, E. H. Immergut, Polymer Handbook, 3rd Edition, J. Wiley, New York 1989.

The volume-average particle size (according to hydrodynamic fractionation (HDF), described in G. R. McGowan, M. A. Langhorst, J. Coll. and Interface Sci. 89, 1 (1982) 92-104) of the emulsion polymer (a) is <500 nm, preferably <200 nm, and more preferably <100 nm.

By an alkyd resin is meant a polyester which has been esterified with a drying oil, a fatty acid or the like (U. Poth, Polyester und Alkydharze, Vincentz Network 2005).

By the alkyd resin (b) is meant an alkyd resin solution which is water-thinnable, after neutralization if appropriate, and is based on an alkyd resin having a sufficiently high acid number, preferably 30-65 mg KOH/g alkyd resin solids, and a weight-average molecular weight of >5000 and <40 000 Da, preferably >8000 and <35 000 Da, and more preferably >10 000 and <35 000 Da.

The alkyd resin (c) is an aqueous alkyd emulsion having a volume-average particle size (according to hydrodynamic fractionation) <200 nm, preferably <100 nm, and a weight-average molecular weight >100000 Da, especially >500000 Da.

Component (c) is completely soluble in organic solvents, such as THF (tetrahydrofuran), for example, and at room temperature is film-forming.

By the alkyd resins (b) are meant, for example, the products WorleeSol® 61 A, WorleeSol® 61E, WorleeSol® 65A, Synthalat® W 46 or Synthalat® W48. It is advantageous to use Synthalat® W 46 or Synthalat® W 48.

By component (c) is meant, for example, the WorleeSol® E 150 W alkyd resin.

The emulsion copolymer can be prepared conventionally by emulsion polymerization.

For the emulsion polymerization it is usual to use ionic and/or nonionic emulsifiers and/or protective colloids and/or stabilizers as surface-active compounds.

An exhaustive description of suitable protective colloids is found in Houben-Weyl, Methoden der organischen Chemie, Volume XIV/1, Makromolekulare Stoffe, Georg-Thieme-Verlag, Stuttgart, 1961, pp. 411 to 420. Suitable emulsifiers include anionic, cationic, and nonionic emulsifiers. As accompanying surface-active substances it is preferred to use exclusively emulsifiers, whose molecular weights, unlike those of the protective colloids, are usually below 2000 g/mol. Where mixtures of surface-active substances are used it is of course necessary that the individual components are compatible with one another, something which in case of doubt can be checked by means of a few preliminary tests. Preference is given to using anionic and nonionic emulsifiers as surface-active substances. Common place accompanying emulsifiers are, for example, ethoxylated fatty alcohols (EO degree: 3 to 50, alkyl radical; $C_8$ to $C_{36}$), ethoxylated mono-, di- and tri-alkylphenols (EO degree: 3 to 50, alkyl radical: $C_4$ to $C_9$), alkali metal salts of dialkyl esters of sulfosuccinic acid and also alkali metal salts and ammonium salts of alkyl sulfates (alkyl radical: $C_8$ to $C_{12}$), of ethoxylated alkanols (EO degree: 4 to 30, alkyl radical: $C_{12}$ to $C_{18}$), of ethoxylated alkylphenols (EO degree: 3 to 50, alkyl radical: $C_4$ to $C_9$), of alkylsulfonic acids (alkyl radical: $C_{12}$ to $C_{18}$), of alkylarylsulfonic acids (alkyl radical: $C_9$ to $C_{18}$), and of sulfates of ethoxylated fatty alcohols.

Suitable emulsifiers are also found in Houben-Weyl, Methoden der organischen Chemie, Volume 14/1, Makromolekulare Stoffe, Georg Thieme Verlag, Stuttgart, 1961, pages 192 to 208.

The surface-active substance is used usually in amounts of 0.1 to 10% by weight, based on all of the monomers to be polymerized.

Examples of water-soluble initiators for the emulsion polymerization are ammonium salts and alkali metal salts of peroxidisulfuric acid, e.g., sodium peroxodisulfate, hydrogen peroxide or organic peroxides, e.g., tert-butyl hydroperoxide.

Particularly suitable are what are called reduction-oxidation (redox) initiator systems.

The redox initiator systems are composed of at least one, usually inorganic, reducing agent and one organic or inorganic oxidizing agent.

The oxidation component comprises, for example, the emulsion polymerization initiators already mentioned above.

The reduction component comprises, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used with the accompaniment of soluble metal compounds whose metallic component is able to occur in a plurality of valence states.

Examples of customary redox initiator systems include ascorbic acid/iron(II) sulfate/sodium peroxidisulfate, tert-butyl hydroperoxide/sodium disulfite, tert-butyl hydroperoxide/Na-hydroxymethanesulfinic acid. The individual components, the reducing component for example, may also be mixtures—for example, a mixture of the sodium salt of hydroxymethanesulfinic acid with sodium disulfite.

The amount of the initiators is generally 0.1 to 10% by weight, preferably 0.1% to 5% by weight, based on all of the monomers to be polymerized. It is also possible to use two or more different initiators for the emulsion polymerization.

The emulsion polymerization takes place in general at 30 to 150° C., preferably 50 to 95° C. The polymerization medium may be composed either of water alone or else of mixtures of water and water-miscible liquids such as methanol. Preferably just water is used. The emulsion polymerization can be carried out either as a batch process or in the form of a feed process, including staged or gradient procedures. Preference is given to the feed process, in which a portion of the polymerization batch or else a polymer seed is introduced into a vessel, heated to the polymerization temperature, and partially polymerized, and then the remainder of the polymerization batch, usually by way of two or more spatially separate feed streams, of which one or more comprise the monomers in pure or emulsified form, is supplied to the polymerization zone continuously, in stages or under a concentration gradient, during which the polymerization is maintained.

The manner in which the initiator is added to the polymerization vessel in the course of the free-radical aqueous emulsion polymerization is known to the person skilled in the art. It may either be included in its entirety in the initial charge to the polymerization vessel or else inserted continuously or in stages at the rate at which it is consumed in the course of the free-radical aqueous emulsion polymerization. In each individual case this will depend, in a manner familiar to the person skilled in the art, both on the chemical nature of the initiator system and on the polymerization temperature. Preferably one part is included in the initial charge and the remainder is supplied to the polymerization zone at the rate of its consumption.

To remove the residual monomers it is also possible to add initiator after the end of the emulsion polymerization proper, i.e., after a monomer conversion of at least 95%. It is usual to use redox systems. This may also be followed by physical deodorization.

The product is an aqueous polymer dispersion which normally has a polymer content (solids content) of 20% to 70% by weight, preferably 40% to 60% by weight, based on the polymer dispersion.

The polymer (a) is introduced together with components (b) and (c), either individually or as a premix, as a binder composition into the paint or varnish mixture.

The fraction of component (b) (calculated on the basis of alkyd resin solids to total binder solids) is between 10% and 35%, preferably between 18% and 25%. The ratio of component (a) to component (c) is between 1:9 and 9:1, preferably between 3:7 and 7:3, more preferably between 4:6 and 6:4.

By additizing—adding a photoinitiator—or siccativizing it is possible to produce surface crosslinking.

Suitable photoinitiators are those which are excited by sunlight, examples being benzophenone or its derivatives. Compounds suitable for siccativizing are the metal compounds recommended for aqueous alkyd resins, based for example on Co or Mn (review in U. Poth, p. 183 f).

The coating material further comprises a pigment. The term "pigment" refers collectively to all pigments and fillers/extenders, examples being color pigments, white pigments, and inorganic fillers/extenders.

Mention may be made of inorganic white pigments such as titanium dioxide, preferably in the rutile form, barium sulfate, zinc oxide, zinc sulfide, basic lead carbonate, antimony trioxide, lithopones (zinc sulfide+barium sulfate) or colored pigments, examples being iron oxides, carbon black, graphite, zinc yellow, zinc green, ultramarine, manganese black, antimony black, manganese violet, Paris blue or Schweinfurter green. Besides the inorganic pigments, the emulsion paints of the invention may also comprise organic color pigments, examples being Sepia, Gamboge, Cassel Brown, Toluidine red, Para red, Hansa Yellow, Indigo, azo dyes, anthraquinoid and indigoid dyes, and also dioxazine, quinacridone, phthalocyanine, isoindolinone, and metal complex pigments.

Synthetic white pigments with air inclusions for increasing light scattering may also be employed. Examples are the Rhopaque™ dispersions.

Examples of suitable fillers/extenders include aluminosilicates, such as feldspar, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicon dioxide, etc. In coating materials preference is of course given to finely divided fillers/extenders. The fillers/extenders can be used as individual components. In practice, however, mixtures of fillers/extenders have been found particularly appropriate, examples being calcium carbonate/kaolin and calcium carbonate/talc For the glossy coating materials of the invention, small amounts, if any, of very finely divided fillers/extenders are acceptable. It is preferred not to use fillers/extenders.

The fraction of the pigments can be described by the pigment volume concentration (PVC), i.e., the ratio of the volume for pigments to the total volume of the dried coating material. The high-gloss paints of the invention have a PVC in the range from 12% to 35%, preferably 15% to 30%.

Besides the polymer and pigment, the aqueous coating material of the invention may comprise further auxiliaries.

The customary auxiliaries, besides the emulsifiers used in the polymerization, include wetting agents or dispersants, such as sodium, potassium or ammonium polyphosphates, alkali metal salts and ammonium salts of acrylic acid copolymers or of maleic anhydride copolymers, polyphosphonates, such as sodium 1-hydroxyethane-1,1-diphosphonate, and salts of naphthalenesulfonic acids, particularly the sodium salts.

Mention may be made additionally of flow control agents, defoamers, biocides, and thickeners.

Examples of suitable thickeners include associative thickeners. Preferred associative thickeners are polyurethane thickeners. The amount of thickener is preferably less than 1% by weight, more preferably less than 0.6% by weight, of thickener solids, based on coating material.

Coating materials of the invention are prepared in a conventional manner by blending the components in mixing equipment customary for this purpose. It has been found appropriate to prepare an aqueous paste or dispersion from the pigments, water, and, if appropriate, the auxiliaries, and only then to mix the polymeric binder, i.e., generally, the aqueous dispersion of the polymer, with the pigment paste or pigment dispersion.

The coating materials of the invention comprise in general 30% to 75% by weight and preferably 40% to 65% by weight of nonvolatiles. By these are meant all constituents of the preparation that are not water, but at least the total amount of binder solids, pigment, and auxiliaries solids. The volatile constituents are predominantly water.

The coating material is preferably a highly glossy coating material.

The gloss of the coating material is determined in accordance with DIN 67530: the coating material is applied with a 240 μm slot width to a glass plate and dried at room temperature for 72 hours. The test specimen is inserted into a calibrated reflectometer, and with a defined angle of incidence a measurement is made of the extent to which the light thrown back has been reflected or scattered. The reflectometer value found is a measure of the gloss (the higher the value, the higher the gloss).

The gloss of the high-gloss paints is preferably greater than 60 at 20° and greater than 80 at 60°.

The reflectometer value is determined at 23° C. and is reported dimensionlessly as a function of the angle of incidence, e.g., 40 at 20°.

The coating material of the invention can be applied in customary fashion to substrates, e.g., by means of spreading, spraying, dipping, rolling, knife-coating, etc.

It is used preferably as an architectural coating material, in other words for coating buildings or parts of buildings. The substrates in question may be mineral substrates such as renders, gypsum or plasterboard, masonry or concrete, wood, wood materials, metal or paper, wallpapers for example, or plastic, PVC for example.

The coating materials of the invention are notable for ease of handling, good processing properties, high hiding power, and, in particular, high gloss. The pollutant content of the coating materials is low. The equipment used can be easily cleaned with water.

EXAMPLES

Dispersion I

A polymerization vessel equipped with metering apparatus and temperature regulation was charged with the following:

| Initial charge: | 528.0 g | water |
|---|---|---|
| | 46.7 g | a polystyrene seed dispersion having a solids content of 33% and an average particle size of 30 nm |
| | 3.67 g | a 15% strength aqueous solution of sodium lauryl sulfate | and this initial charge was heated to 85° C. with stirring. Subsequently, while maintaining this temperature, 5% of feed stream 2 was added and the mixture was stirred for 5 minutes. Thereafter feed stream 1 was metered in over 180 minutes and in parallel therewith the remainder of feed stream 2, over 195 minutes.

| Feed stream 1: | 543.2 g | water |
|---|---|---|
| | 125.4 g | a 15% strength aqueous solution of sodium lauryl sulfate |
| | 458.0 g | n-butyl acrylate |
| | 399.6 g | methyl methacrylate |
| | 165.1 g | styrene |
| | 22.78 g | methacrylic acid |
| | 21.45 g | ureidomethacrylate |
| | 33.0 g | Bisomer MPEG 350 MA (from Laporte Performance Chemicals UK) |
| Feed stream 2: | 83.6 g | water |
| | 4.4 g | sodium peroxodisulfate |

When feed stream 1 was ended, 22 g of water were added; when feed stream 2 was ended, polymerization was continued for 30 minutes and the batch was neutralized with 7.47 g of ammonia (as a 25% strength aqueous solution). Thereafter 13.2 g of hydrogen peroxide (as a 5% strength aqueous solution) were added and a solution of 0.557 g of ascorbic acid in 4.96 g of water was metered in over 60 minutes. The dispersion was subsequently cooled and filtered through a 125 μm filter. This gave 2.48 kg of a 46% dispersion.

Dispersion II

A polymerization vessel equipped with metering apparatus and temperature regulation was charged with the following:

| Initial charge: | 286 g | water |
|---|---|---|
| | 47.7 g | a polystyrene seed dispersion having a solids content of 33% and an average particle size of 30 nm | and this initial charge was heated to 82° C. with stirring. At this temperature 25% of feed stream 2 was added and the mixture was stirred for a further 5 minutes. Then feed stream 1 and the remainder of feed stream 2 were metered in over 180 minutes, retaining the 82° C.

| Feed stream 1: | 519 g | water |
|---|---|---|
| | 55.0 g | a fatty alcohol ethoxylate, degree of ethoxylation approximately 30 (as a 20% strength aqueous solution) |
| | 73.3 g | a sodium $C_{12/14}$ alkyl polyglycol ether sulfate, degree of ethoxylation approximately 30 (as a 30% strength aqueous solution) |
| | 37.4 g | acrylamide (as a 50% strength aqueous solution) |
| | 32.9 g | acrylic acid |
| | 503 g | styrene |
| | 545 g | n-butyl acrylate |
| Feed stream 2: | 29.2 g | water |
| | 2.2 g | sodium peroxodisulfate |

After the end of the feed, 32 g of water were added and polymerization was continued for 15 minutes. Subsequently 7.95 g of ammonia (as a 25% strength aqueous solution) were added and feed streams 3 and 4 were metered in over 60 minutes in parallel.

| Feed stream 3: | 11.1 g | tert-butyl hydroperoxide (as a 10% strength aqueous solution) |
|---|---|---|
| Feed stream 4: | 33.1 g | water |
| | 0.684 g | ascorbic acid |

Then 9.5 g of hydrogen peroxide (as a 5% strength aqueous solution), 13.4 g of ammonia (as a 25% strength aqueous solution), and 6.1 g of water were added and the mixture was subsequently stirred at 80° C. for 60 minutes. Thereafter the dispersion was cooled and filtered through a 125 μm filter. This gave 2300 g of a 50.5% dispersion.

The hybrids used in the aqueous coating materials were prepared as follows:

Hybrid I

An initial charge of 27.5 g of WorleeSol® E 150 was admixed with 27.5 g of dispersion I while stirring.

Hybrid II

An initial charge of 16.9 g of Synthalat® W 46 is admixed with 55 g of hybrid I while stirring.

Hybrid III

An initial charge of 41.2 g of WorleeSol® E 150 W is admixed with 13.8 g of dispersion I while stirring.

Hybrid IV

An initial charge of 13.8 g of WorleeSol® E 150 W is admixed with 41.2 g of dispersion I while stirring.

Hybrid V

An initial charge of 5.5 g of WorleeSol® E 150 W is admixed with 49.5 g of dispersion I while stirring.

Hybrid VI

An initial charge of 27.5 g of WorleeSol® E 150 W is admixed with 27.5 g of a 40% dilution of dispersion II while stirring.

Hybrid VII

An initial charge of 27.5 g of Synthalat® AEM 700 TC is admixed with 27.5 g of dispersion I while stirring.

The components of the hybrids, and other binders employed in the examples, are listed in the tables below, with manufacturer and properties.

TABLE 1.1

| Name | Manufacturer | solids content/% | Acid number* mg KOH/g solids | Mw** |
|---|---|---|---|---|
| Resydrol ® AS 894 w | Cytec Surface Specialties, Graz | 88-92 | 45.2 | 1720 |
| Resydrol ® VAL 5547 w | Cytec Surface Specialties, Graz | 96-100 | 46.8 | 2840 |
| Synthalat ® W 46 | Synthopol Chemie, Buxtehude | 39-41 | 59 | 18100 |
| Synthalat ® W 48 | Synthopol Chemie, Buxtehude | 35-37 | 55.8 | 21300 |
| WorleeSol ® 61 A | Worlee-Chemie GmbH, Lauenburg | 73-77 | 41.3 | 14800 |
| WorleeSol ® 61 E | Worlee-Chemie GmbH, Lauenburg | 73-78 | 41.4 | 17600 |
| WorleeSol ® 65 A | Worlee-Chemie GmbH, Lauenburg | 68-72 | 37 | 30900 |

*DIN EN ISO 2114 converted for binder solids
**Weight average, size exclusion chromatography (SEC)

TABLE 1.2

| Name | Manufacturer | Solids content/% | Mw* | Particle size**/nm |
|---|---|---|---|---|
| Synthalat ® AEM 700 TC | Synthopol, Buxtehude | 53-57 | 6400 | 471 |
| WorleeSol ® E 150 W | Worlee Chemie GmbH, Lauenburg | 38-42 | 1060000 | 61 |

*Weight average, size exclusion chromatography (SEC)
**Volumetric average, determined by hydrodynamic fractionation (HDF)

TABLE 1.3

| Name | Solids content/% | MFT*/° C. | Particle size**/nm |
|---|---|---|---|
| Dispersion II | 49-51 | 20 | 168 |
| Dispersion I | 45-47 | 21 | 85 |

*Minimum film-forming temperature (DIN ISO 2115)
**Volumetric average, determined by hydrodynamic fractionation (HDF)

TABLE 2

| Name | Function | Manufacturer |
|---|---|---|
| Disperbyk ® 190 | dispersant | Byk-Chemie GmbH, Wesel |
| Byk ® 020 | defoamer | Byk-Chemie GmbH, Wesel |
| Efka ®-4550 | dispersant | Efka-Additives B.V., Heerenveen, Netherlands |
| DSX 2000 and DSX 1514 | thickener | Cognis Deutschland GmbH & Co. KG, Düsseldorf |
| Collacral ® LR 8990 | thickener | BASF AG, Ludwigshafen |
| Kronos ® 2190 | titanium dioxide pigment | Kronos Titan GmbH, Leverkusen |
| Acrysol ® RM8 and RM2020 | thickener | Rohm & Haas Deutschland GmbH, Frankfurt |

Preparation of Aqueous Coating Materials

The individual components (for manufacturer list see Tables 1 and 2) were metered in with stirring, using a toothed-disk stirrer, in the amount (parts by weight) and sequence as indicated in the tables below. Following the addition of the titanium dioxide pigment the speed was increased to 2000 rpm and dispersion was continued until the pigment paste was smooth, i.e., free from lumps. The formulation was then left to cool to room temperature, if necessary, and the remaining components were added at a reduced speed.

Testing of Aqueous Coating Materials

The aqueous coating materials were characterized by measurement of viscosities (at 2 shear rates) and gloss. For this purpose, films were drawn down using a box-type doctor blade (240 μm slot height) onto glass plates and dried for 3 days under standard conditions (23° C., 50% relative humidity). To describe the apparent visual gloss, the gloss in accordance with DIN, and the haze, were determined. The haze is a measure of the diffuse reflection which is apparent in the film surface, when an object is reflected, as a milky mirror image. Highly glossy surfaces are distinguished by high gloss values, particularly at the more sensitive 20° geometry, and low haze values.

TABLE 3.1

|  | 1 | 2 | 3 | 4 | 5 | Glasurit white paint, water-thinnable, high gloss | Glasurit colored paint EA, synthetic resin-based, high gloss (white) |
|---|---|---|---|---|---|---|---|
| Synthalat ® W 48, 37% | 18.2 | | | | | | |
| Synthalat ® W 46, 40% | | 16.9 | | | | | |
| WorleeSol ® 65 A, 70% | | | | | 9.6 | | |
| Water | 7 | 7 | 7.9 | 7.9 | 6.4 | | |
| Disperbyk ® 190 | | | 2.5 | 2.5 | | | |
| Ammonia, 25% | 0.4 | 0.4 | | | 0.4 | | |
| Efka ® 4550 | 0.5 | 0.5 | | | 0.5 | | |
| Byk ® 020 | 0.5 | 0.5 | 0.5 | 0.5 | 0.5 | | |
| DSX2000/1514 (ratio 1:0.3) | | | 1.3 | | | | |
| Collacral ® LR 8990, 40% | | | | 1.3 | | | |
| Propylene glycol | 1.3 | 1.3 | | | 1.3 | | |

TABLE 3.1-continued

|  | 1 | 2 | 3 | 4 | 5 | Glasurit white paint, water-thinnable, high gloss | Glasurit colored paint EA, synthetic resin-based, high gloss (white) |
|---|---|---|---|---|---|---|---|
| Kronos 2190 | 25 | 25 | 25 | 25 | 25 | | |
| Disperse at 2000 rpm for 15 min | | | | | | | |
| WorleeSol ® 61 E, 75% | | | | 9 | | | |
| Ammonia, 4% | | | | 2.5 | | | |
| Propylene glycol | 1 | 1 | 2.3 | 2.3 | 1 | | |
| Hybrid I, 43% | 55 | 55 | 55 | | 55 | | |
| Hybrid II | | | | 71.9 | | | |
| Acrysol ® RM2020/RM8 (ratio 1:0.3) | 1.6 | 1.6 | | | 0.7 | | |
| Water | | | 5.3 | | 2 | | |
|  | 110.5 | 109.2 | 111.3 | 111.4 | 102.4 | | |
| Tests | | | | | | | |
| Viscosity (ENISO 3219)/mPas | | | | | | | |
| At 102 1/s | 1140 | 1160 | 2770 | 1970 | 2070 | | |
| At 4390 1/s | 205 | 204 | 179 | 137 | 236 | | |
| Film on glass, 240 μm, 3 d RT | | | | | | | |
| Gloss* | | | | | | | |
| At 60° | 82 | 86 | 89 | 87 | 92 | 88 | 88 |
| At 20° | 65 | 74 | 80 | 78 | 84 | 63 | 78 |
| Haze* | 142 | 45 | 3 | 8 | 81 | 120 | 19 |

*Measured using the haze-gloss instrument from Byk-Gardner, Geretsried

Examples 1 to 5 show that with the aqueous coating materials of the invention the gloss level of solvent-based alkyd resin paints (example: Glasurit® EA) is attained. The gloss level of commercially customary emulsion paints (example: Glasurit® white paint, water-thinnable) is far exceeded. The 3 primary binder components can be used as a partial premix or, as in Example 4, as a complete premix.

TABLE 3.2.

|  | 6 | 7 | 8 | 9 | 10 | 11 |
|---|---|---|---|---|---|---|
| WorleeSol ® 61 A, 75% | 9 | 9 | 9 | 9 | 9 | 9 |
| Ammonia, 25% | 0.4 | 0.4 | 0.4 | 0.4 | 0.4 | 0.4 |
| Efka ® 4550 | 0.5 | 0.5 | 0.5 | 0.5 | 0.5 | 0.5 |
| Byk ® 020 | 0.5 | 0.5 | 0.5 | 0.5 | 0.5 | 0.5 |
| Water | 7 | 7 | 7 | 7 | 7 | 7 |
| Propylene glycol | 1.3 | 1.3 | 1.3 | 1.3 | 1.3 | 1.3 |
| Kronos ® 2190 | 25 | 25 | 25 | 25 | 25 | 25 |
| Disperse at 2000 rpm for 15 min, leave to cool | | | | | | |
| Propylene glycol | 1 | 1 | 1 | 1 | 1 | 1 |
| Hybrid I | 55 | | | | | |
| Hybrid III | | 55 | | | | |
| Hybrid IV | | | 55 | | | |
| Hybrid V | | | | 55 | | |
| Hybrid VI | | | | | 55 | |
| Dispersion II, 40% | | | | | | 55 |
| RM2020/RM8 (ratio 1:0.3) | 0.7 | 0.7 | 1.4 | 1.4 | 1 | 1 |
| Water | 2 | 2 | 2 | 2 | 2 | 2 |
|  | 102.4 | 102.4 | 103.1 | 103.1 | 102.7 | 102.7 |
| Tests | | | | | | |
| Viscosity (ENISO 3219)/mPas | | | | | | |
| at 102 1/s | 2220 | 2560 | 3580 | 2690 | 1970 | 487 |
| at 4390 1/s | 262 | 294 | 279 | 367 | 296 | 136 |
| Film on glass, 240 μm, 3 d RT | | | | | | |
| Gloss | | | | | | |
| at 60° | 91 | 88 | 87 | 87 | 90 | 94 |
| at 20° | 81 | 78 | 72 | 86 | 75 | 77 |
| Haze | 13 | 14 | 82 | 89 | 53 | 89 |

In Examples 6 to 9 the ratio of alkyd emulsion to acrylate dispersion was varied. A reduced fraction of the alkyd emulsion had the effect of lower gloss values and, in particular, increased haze.

In Example 10 the acrylate component dispersion I was replaced by dispersion II. With this as well a high gloss was obtained, but the haze was not quite as low as with hybrid I. With dispersion II alone (Example 11), in other words without alkyd emulsion, the haze increased further.

TABLE 3.3.

|  | 12 | 13 | 14 |
|---|---|---|---|
| Resydrol ® VAL 5547 w, 98% | 6.9 | | |
| Resydrol ® AS 894, 90% | | 7.5 | |
| Ammonia, 25% | 0.4 | 0.4 | |
| Efka ® 4550 | 0.5 | 0.5 | |
| Disperbyk ® 190 | | | 2.5 |
| Byk ® 020 | 0.5 | 0.5 | 0.5 |
| Water | 7 | 7 | 7.9 |
| DSX2000/1514 (ratio 1:0.3) | | | 1.3 |
| Propylene glycol | 1.3 | 1.3 | |
| Kronos 2190 | 25 | 25 | 25 |
| Disperse at 2000 rpm for 15 min, leave to cool | | | |
| Propylene glycol | 1 | 1 | 2.3 |
| WorleeSol ® 61 E, 75% | | | 9 |
| Ammonia, 4% | | | 2.5 |

TABLE 3.3.-continued

|  | 12 | 13 | 14 |
|---|---|---|---|
| Hybrid I | 55 | 55 |  |
| Hybrid VII |  |  | 55 |
| RM2020/RM8 (ratio 1:0.3) | 0.7 | 0.7 |  |
|  | 98.3 | 98.9 | 106 |
| Tests |  |  |  |
| Viscosity (ENISO 3219)/mPas |  |  |  |
| at 102 1/s | 542 | 1750 | 1480 |
| at 4390 1/s | 146 | 205 | 523 |
| Film on glass, 240 μm, 3d RT |  |  |  |
| Gloss |  |  |  |
| at 60° | 72 | 37 | 74 |
| at 20° | 29 | 9 | 31 |
| Haze | 363 | 251 | 338 |

Examples 12 to 14, which are comparative examples, demonstrate the effect of non-inventive alkyd components: in all 3 cases the result was low gloss values and extremely high haze. Visually as well, the paints appeared as only satin-gloss or even silk-matt.

The invention claimed is:
1. An aqueous binder composition, comprising:
a) at least one emulsion copolymer,
b) at least one water-soluble alkyd resin having a weight-average molecular weight between 5000 and 40 000 Da, and
c) at least one alkyd resin having a weight-average molecular weight of more than 100 000 Da in the form of an aqueous emulsion,
wherein
each emulsion copolymer (a) comprises
(i) 3 to 15% by weight of monomers of the formula I or II

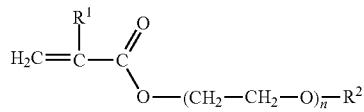

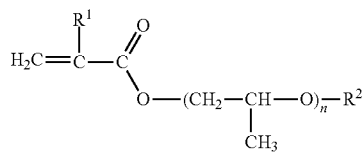

or mixtures thereof,
in which $R^1$ is a hydrogen atom or a methyl group, $R^2$ is a hydrogen atom or an aliphatic or aromatic hydrocarbon group having 1 to 20 carbon atoms and n is an integer from 3 to 15,
(ii) 40 to 97% by weight of a $C_1$-$C_8$ alkyl (meth)acrylate, a vinylaromatic compound having up to 20 carbon atoms, or mixtures thereof, and
(iii) 0 to 50% by weight of other monomers, and the solids content of the mixture of (a), (b), and (c) is less than 60% by weight.
2. The aqueous binder composition according to claim 1, wherein each of the at least one water-soluble alkyd resin (b) has an acid number between 30 and 65 mg KOH/g.
3. The aqueous binder composition according to claim 1, wherein the vinyl aromatic compound having up to 20 carbon atoms is at least one compound selected from the group consisting of vinyltoluene, α- and p-methylstyrene, α-butylstyrene, 4-n-butylstyrene, 4-n-decylstyrene, and styrene.
4. The aqueous binder composition according to claim 3, wherein the $C_1$-$C_8$ alkyl (meth)acrylate is at least one (meth)acrylate selected from the group consisting of methyl methacrylate, n-butyl acrylate, isobutyl acrylate, tert-butyl acrylate, ethyl acrylate, and 2-ethylhexyl acrylate.
5. The aqueous binder composition according to claim 1, wherein $R^2$ is a $C_1$ to $C_4$ alkyl group.
6. The aqueous binder composition according to claim 1, wherein each of the at least one emulsion copolymer (a) is an emulsion copolymer having a glass transition temperature of less than 50° C.
7. The aqueous binder composition according to claim 1, wherein the volume-average particle size of component (c) is <200 nm.
8. The aqueous binder composition according to claim 1, wherein the volume-average particle size of component (a) is <500 nm.
9. The aqueous binder composition according to claim 1, wherein the fraction of component (b) as a proportion of the total binder is between 10% and 35% by weight, calculated as alkyd resin solids based on total binder solids.
10. The aqueous binder composition according to claim 1, wherein the weight ratio of component (c) to component (a) is between 1:9 and 9:1, which is calculated on the basis of alkyd resin solids to emulsion polymer solids.
11. A process for preparing a coating material, comprising: incorporating the aqueous binder composition of claim 1 into a coating material.
12. A process for preparing a high-gloss paint, comprising: incorporating the aqueous binder composition of claim 1 into a high-gloss paint.
13. A coating material comprising the aqueous binder composition according to claim 1.
14. The coating material according to claim 13, which is a high-gloss paint having a gloss of more than 60 at 20°, wherein ° is the angle of incidence.
15. The process for preparing the coating material according to claim 11, wherein said process comprises admixing components (a), (b) and (c), alone or in any combination thereof, into the coating material.
16. The coating material according to claim 13, further comprising a pigment.
17. The coating material according to claim 16, having a pigment volume concentration, PVC, of from 12% to 35%, which is a ratio of a volume for pigments present in said coating material to a total volume of said coating material when dried.
18. The coating material according to claim 16, comprising 30% to 75% by weight, relative to the total weight of the coating material, of said binder, said pigment and optionally auxiliary solids, all of which are nonvolatile, and the remainder of the coating material is water.

* * * * *